(12) United States Patent
Choi et al.

(10) Patent No.: US 7,181,754 B2
(45) Date of Patent: Feb. 20, 2007

(54) DISK CARTRIDGE

(75) Inventors: Han-kook Choi, Suwon-si (KR);
Dong-seob Jang, Seoul (KR);
Dae-kyong Park, Seongnam-si (KR);
Kwang Kim, Suwon-si (KR);
Yong-hoon Lee, Suwon-si (KR);
Hae-sub Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 10/754,638

(22) Filed: Jan. 12, 2004

(65) Prior Publication Data

US 2005/0097591 A1    May 5, 2005

(30) Foreign Application Priority Data

Nov. 4, 2003    (KR) .................. 10-2003-0077767

(51) Int. Cl.
*G11B 23/03* (2006.01)
(52) U.S. Cl. .................................... 720/728
(58) Field of Classification Search ............ 360/133; 369/291, 291.1; 720/719, 728
See application file for complete search history.

(56) References Cited

U.S. PATENT DOCUMENTS

| | | | | |
|---|---|---|---|---|
| 5,422,775 A | * | 6/1995 | Martin | ............ 360/133 |
| 5,907,535 A | | 5/1999 | Takahashi et al. | |
| 6,014,365 A | | 1/2000 | Tanaka | |
| 6,078,563 A | * | 6/2000 | Goto et al. | .................. 720/735 |
| 6,137,771 A | * | 10/2000 | McGrath et al. | ............ 720/728 |
| 6,459,544 B1 | * | 10/2002 | Harper | ................... 360/133 |
| 6,522,623 B1 | | 2/2003 | Fujita | |
| 6,874,157 B2 | * | 3/2005 | Taguchi et al. | ............. 720/719 |
| 7,028,322 B2 | * | 4/2006 | Okazawa et al. | .......... 720/725 |
| 2004/0103425 A1 | * | 5/2004 | Nagasato | .................. 720/728 |
| 2004/0107432 A1 | * | 6/2004 | Berkson et al. | ............. 720/728 |
| 2005/0018333 A1 | * | 1/2005 | Okazawa et al. | .............. 360/1 |
| 2005/0162780 A1 | * | 7/2005 | Kobayashi et al. | ......... 360/133 |
| 2005/0257233 A1 | * | 11/2005 | Okazawa et al. | .......... 720/725 |

FOREIGN PATENT DOCUMENTS

JP    11-162133    6/1999

* cited by examiner

*Primary Examiner*—Allen Cao
(74) *Attorney, Agent, or Firm*—Stein, McEwen & Bui, LLP

(57) ABSTRACT

A disk cartridge which includes a case having an upper wall, a lower wall, and a sidewall, which form an inner receiving space in which a disk is inserted, an opening formed in at least one of the upper wall and lower wall of the case to allow a recording/reproducing unit of a disk drive to access the disk therethrough, and an inlet hole formed at the sidewall of the case to allow the disk to be inserted into and withdrawn from the case therethrough.

25 Claims, 12 Drawing Sheets

DISK CARTRIDGE

CROSS-REFERENCE TO RELATED APPLICATIONS

This application claims the benefit of Korean Patent Application No. 2003-77767, filed on Nov. 4, 2003 and is based on Korean Patent Application No. 2003-41293, filed on Jul. 15, 2002, in the Korean Intellectual Property Office, the disclosures of which are incorporated herein by reference.

BACKGROUND OF THE INVENTION

1. Field of the Invention

The present invention relates to a disk cartridge in which a disk, i.e., an information recording and reproducing medium, is enclosed to prevent the disk from being contaminated.

2. Description of the Related Art

FIG. 1 is a diagram of a conventional disk cartridge. The conventional disk cartridge includes an upper case 11 and a lower case 12, which rotate about a rotational axis 14 to be opened or closed, and a disk receiving space, which is formed between the upper and lower cases 11 and 12 and receives a disk D. Accordingly, if a data recording/reproducing process needs to be performed in the disk D, the upper and lower cases 11 and 12 in which the disk D is received are coupled to each other as shown in FIG. 2 and then are loaded into a disk drive (not shown). If the disk D needs to be replaced with a new one, the upper and lower cases 11 and 12 are detached from each as shown in FIG. 1 and then the disk D is withdrawn from the upper and lower cases 11 and 12. An opening 12b is formed in the lower case 12 to allow an optical pickup (not shown) within the disk drive to access the disk D in the disk cartridge. A shutter 13 closes the opening 12b, but opens the opening 12b when the disk cartridge is mounted on the disk drive. An elastic hook portion 11a is formed on the upper case 11 and is engaged with a locking portion 12a formed on the lower case 12 when the disk cartridge is closed. If the disk cartridge is opened, the elastic hook portion 11a is elastically deformed and slightly lifted so that the elastic hook portion 11a can be disengaged from the locking portion 12a.

The conventional disk cartridge must be opened and closed whenever the disk D is replaced. As most disk cartridges recently become thinner, it is not easy to hold the upper and lower cases 11 and 12 of the thin disk cartridge in and open the upper and lower cases. Furthermore, the elastic hook portion 11a may be deformed or damaged due to frequent opening/closing operations for disk replacement, resulting in the need for a new disk cartridge.

SUMMARY OF THE INVENTION

Accordingly, it is an aspect of the present invention to provide a disk cartridge, which allows a disk to be replaced in a more convenient and stable manner.

Additional aspects and/or advantages of the invention will be set forth in part in the description which follows and, in part, will be obvious from the description, or may be learned by practice of the invention.

The foregoing and/or other aspects of the present invention are achieved by providing a disk cartridge comprising a case having an upper wall, a lower wall, and a sidewall, which form an inner receiving space in which a disk is received, an opening formed in at least one of the upper wall and lower wall of the case to allow a recording/reproducing unit of a disk drive to access the disk therethrough, and an inlet hole formed at the sidewall of the case to allow the disk to be inserted into and withdrawn from the case therethrough.

The disk cartridge further comprising a cover having a case accommodating space for accommodating an area of the disk cartridge, ranging from the inlet hole of the case to at least the opening of the case.

BRIEF DESCRIPTION OF THE DRAWINGS

These and/or other aspects and advantages of the invention will become apparent and more readily appreciated from the following description of the embodiments taken in conjunction with the accompanying drawings of which.

DETAILED DESCRIPTION OF THE PREFERRED EMBODIMENTS

Figure 1:
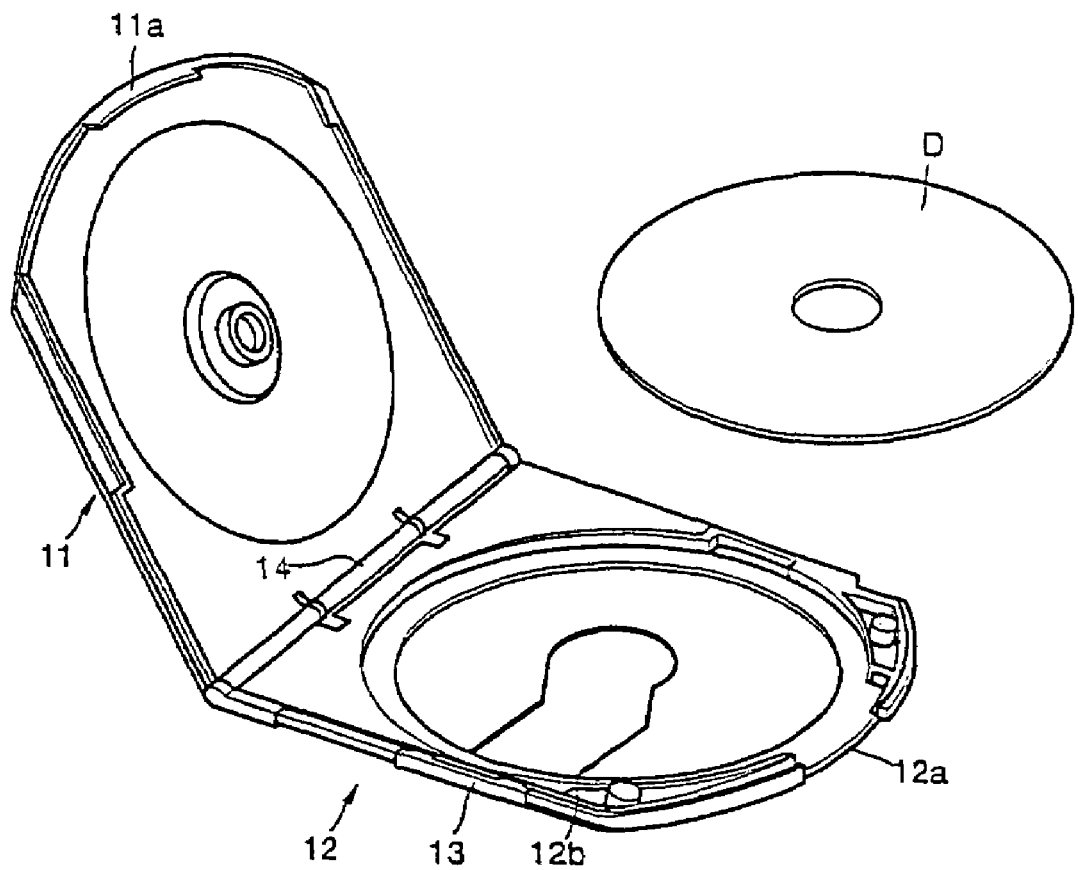
FIG. 1 is a perspective view of a conventional disk cartridge when a case is opened.
Figure 2:
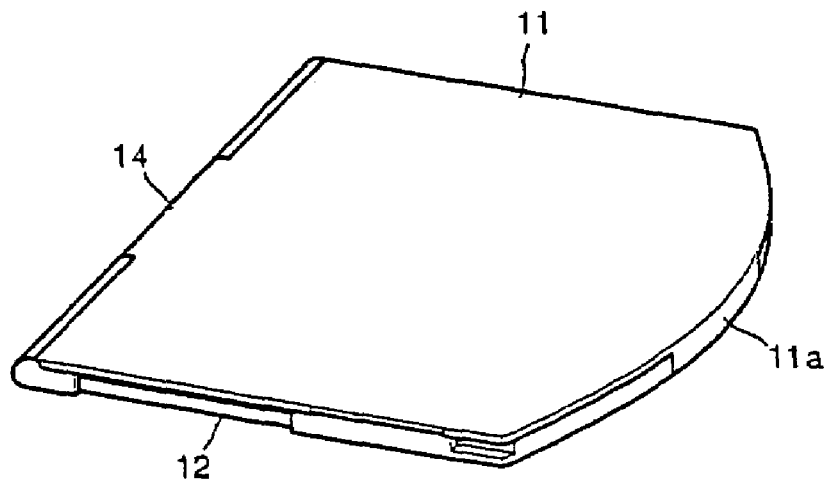
FIG. 2 is a perspective view of the conventional disk cartridge when the case is closed.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
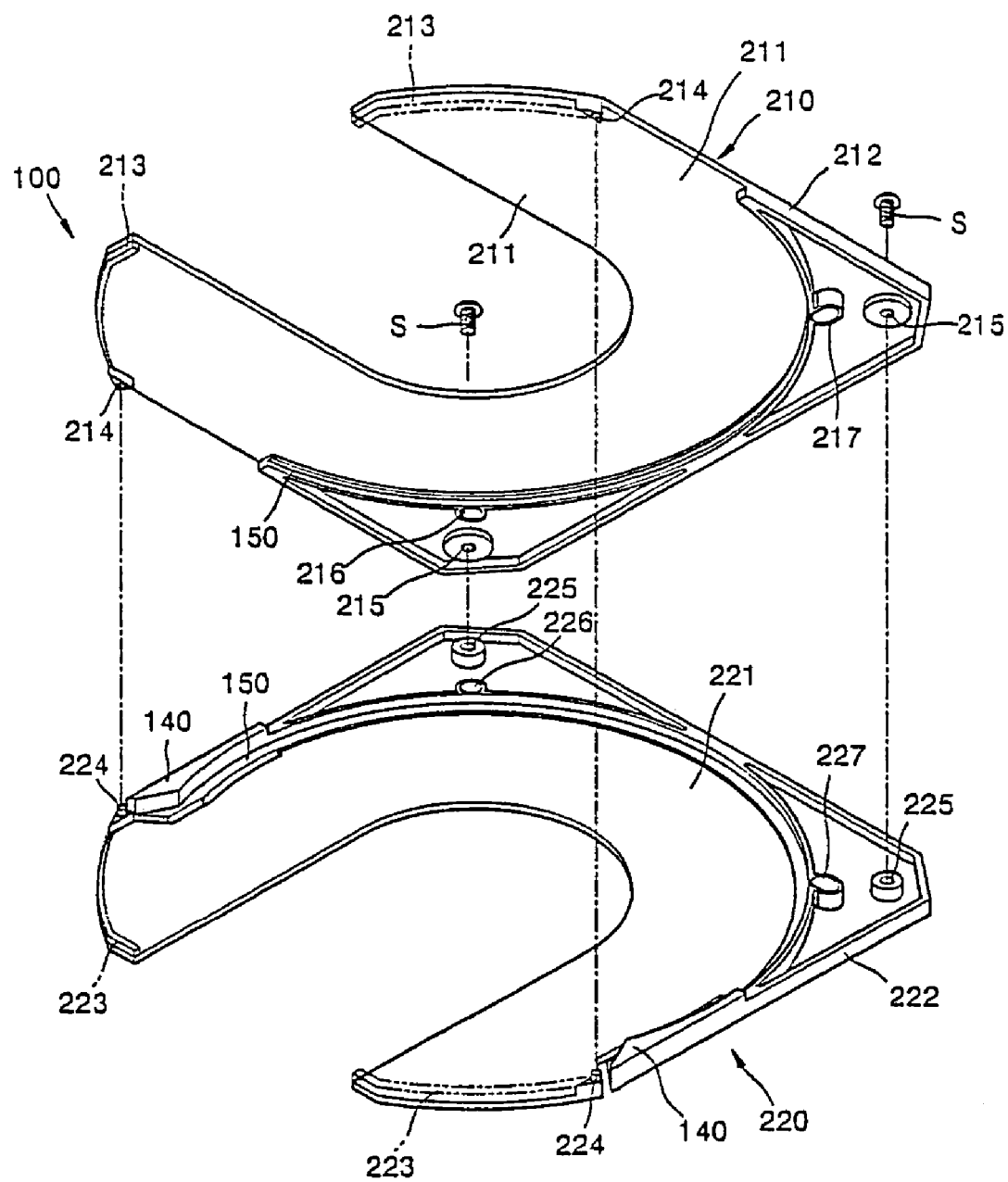
FIG. 3 is an exploded perspective view of a disk cartridge according to a first embodiment of the present invention.
Figure 4:
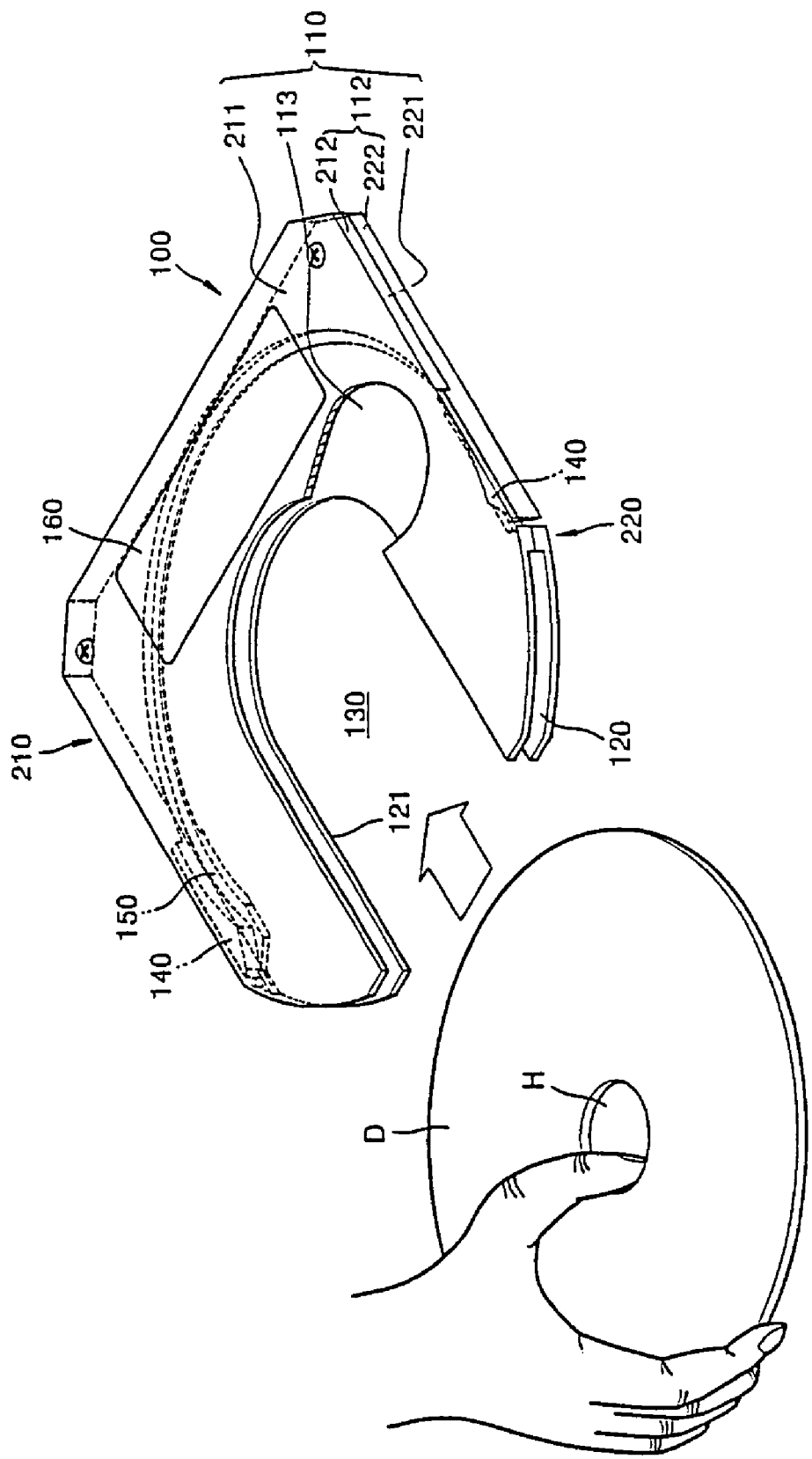
FIG. 4 is a perspective view of the disk cartridge of FIG. 3 when upper and lower cases are coupled to each other.

FIG. 3 is an exploded perspective view of a disk cartridge according to a first embodiment of the present invention, and FIG. 4 is a perspective view of the disk cartridge of FIG. 3 when upper and lower cases are coupled to each other.

In FIGS. 3 and 4, a disk cartridge 100 comprises a case 110 in which a disk D is inserted. The case 110 has an upper case 210 and a lower case 220. The upper case 210 comprises an upper wall 211 and an upper sidewall portion 212, which downwardly extends from an edge portion of the upper wall 211. The lowercase 220 comprises a lower wall 221, which faces the upper wall 211, and a lower sidewall portion 222, which upwardly extends from an edge portion of the lower wall 221. An upper open portion 213 and a lower open portion 223 are respectively formed on the upper sidewall portion 212 and the lower sidewall portion 222 in parallel to a recording surface of the disk D. The upper and lower cases 210 and 220 are first coupled to each other when insertion protrusions 224 formed on the lower case 220 are inserted into insertion holes 214 formed on the upper case 210. Thereafter, the upper and lower cases 210 and 220 are completely coupled to each other when screws S are driven into upper coupling holes 215 formed on the upper case 210 and lower coupling holes 225 formed on the lower case 220. However, as an alternative, the upper and lower cases 210 and 220 may be integrally formed with each other by thermal bonding.

When the upper and lower cases 210 and 220 are completely coupled to each other, the upper and lower sidewall portions 212 and 222 are engaged with each other to form a sidewall 112 as shown in FIG. 4. A space formed between the upper and lower walls 211 and 221 by the sidewall 112 becomes an inner receiving space 113 in which the disk D is inserted. As a result, the case 110 comprising the upper and lower walls 211 and 221, the sidewall 112, and the inner receiving space 113 is formed. Further, when the upper and lower cases 210 and 220 are coupled to each other, the upper and lower open portions 213 and 223 face each other, forming an inlet hole 120 in parallel to the recording surface of the disk D and allows the disk D to be inserted into and withdrawn from the coupled upper and lower cases 210 and 220 therethrough, as shown in FIG. 4.

Figure 5:
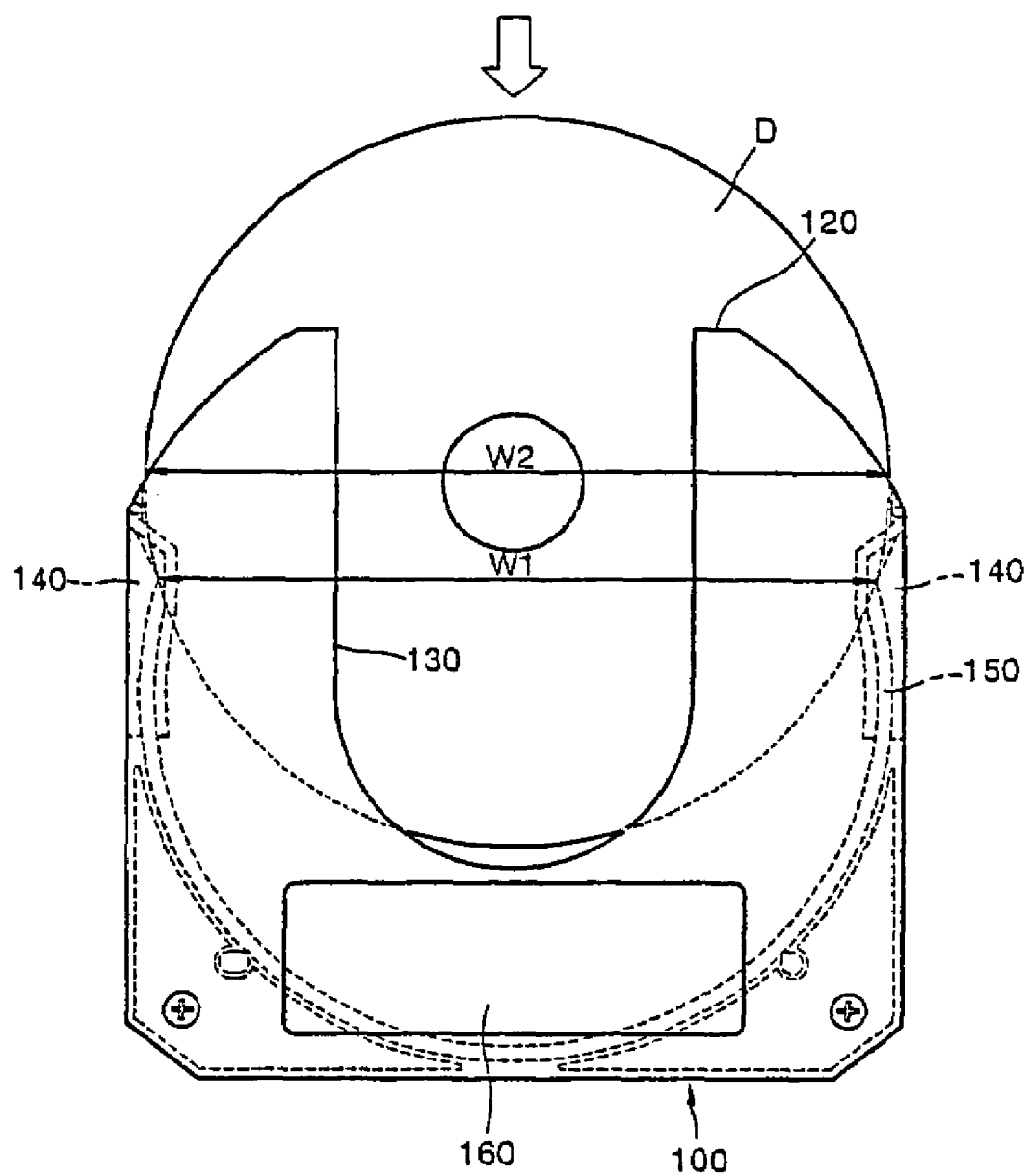
FIGS. 5 through 8 are diagrams illustrating operations of inserting a disk into the disk cartridge of FIG. 3.

The disk D is replaced with a new one through the inlet hole 120. Therefore, the disk D is inserted into the inner receiving space 113 of the case 110 through the inlet hole 120 and is withdrawn from the case 110 through the inlet hole 120, without opening and closing the case 110. Thus, the disk D can be replaced conveniently. The disk cartridge 100 further comprises a holding portion so that the disk D inserted into the case 110 through the inlet hole 120 cannot be unexpectedly separated from the case 110 through the inlet hole 120. In FIG. 3, elastic protrusions 140, acting as the holding portion, extend from the lower sidewall portion 222 of the lower case 220. The elastic protrusions 140 are elastically biased toward the inner receiving space 113 of the case 110, and a distance W1 between the elastic protrusions 140 is smaller than a diameter W2 of the disk D, as shown in FIGS. 3 through 5. Therefore, the disk D can be inserted into and withdrawn from the case 110 through the inlet hole 120 only when the disk D can overcome the elastic force of the elastic protrusions 140 and make the distance W1 between the elastic protrusions 140 greater than the diameter W2 of the disk D. Therefore, the disk D is not erroneously separated from the case 110 unless a force strong enough to elastically spread the elastic protrusions 140 is applied to the disk D.

When the disk cartridge 100 is loaded into a disk drive (not shown), it is necessary that a turntable (not shown) of a spindle motor (not shown) that is inserted into a central hole H of the disk D to rotate the disk D, a clamper (not shown), and a recording/producing unit, such as an optical pickup (not shown), for recording and/or reproducing information on the disk D can access the disk D. Therefore, an opening 130 is formed in the case 110 as shown in FIG. 4. The opening 130 may be formed in both the upper and lower walls 211 and 221 as shown in FIG. 4 or formed in either the upper wall 211 or the lower wall 221. The opening 130 has a slot shape that extends from the central hole H of the disk D toward the inlet hole 120. The opening 130 is symmetrical with respect to a central portion of the disk D according to the first embodiment of the present invention. The disk cartridge 100 according to the first embodiment of the present invention does not include a shutter for opening and closing the opening 130 because the disk cartridge 100 can prevent the disk D from being contaminated during movement without the use of a shutter. Therefore, although a part of the disk D is exposed, when a user holds the upper and lower cases 210 and 220 and moves the disk cartridge 100, the recording surface of the disk D is not contaminated.

Figure 8:
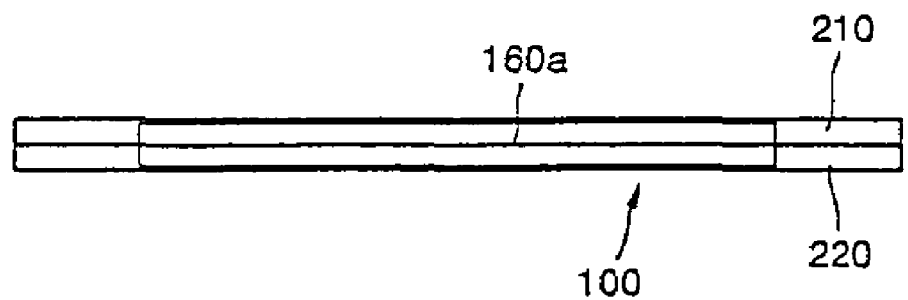
Figure 9:
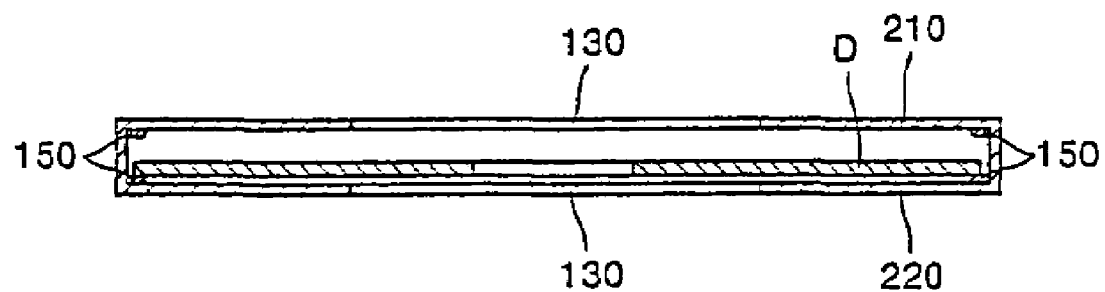
FIG. 9 is a cross-sectional view taken through the line IX—IX of FIG. 7.

In FIG. 9, upper and lower support portions 150 respectively project from the upper and lower cases 210 and 220 and support an outermost edge portion, which is a non-information side, of the disk D to protect the recording surface of the disk D. Position determining holes 216, 226, 217 and 227 determine an exact position where the disk cartridge 100 is loaded in the disk drive (as shown in FIG. 3). In FIG. 4, an upper label region 160 is formed on the upper case 210. In FIG. 8, a sidewall label region 160a is formed on a portion of the sidewall 112 opposite to the inlet hole 120. A lower label region (not shown) is also formed on the lower case 220 corresponding to the upper label region 160 formed on the upper case 210.

Figure 6:
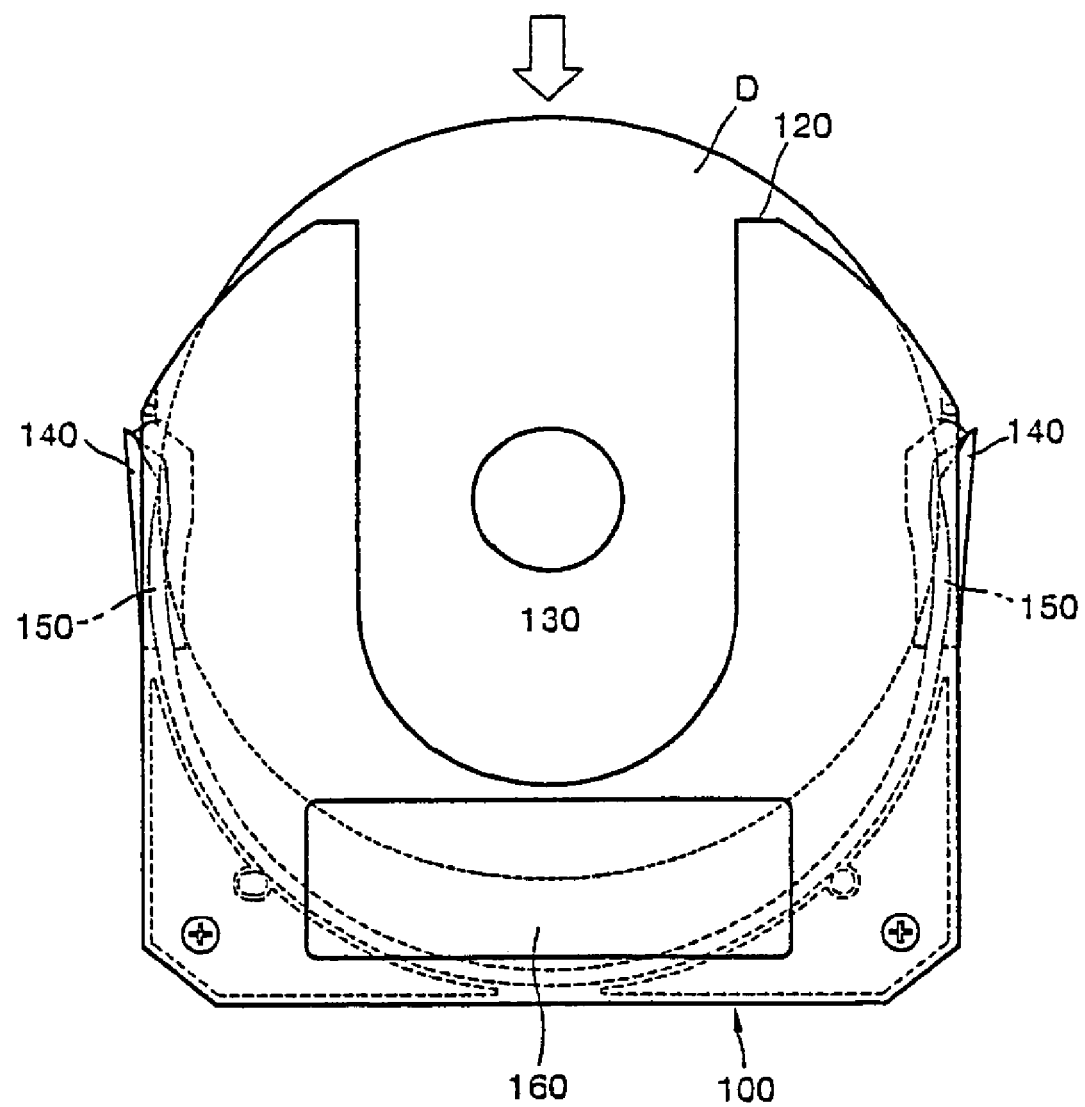
Figure 7:
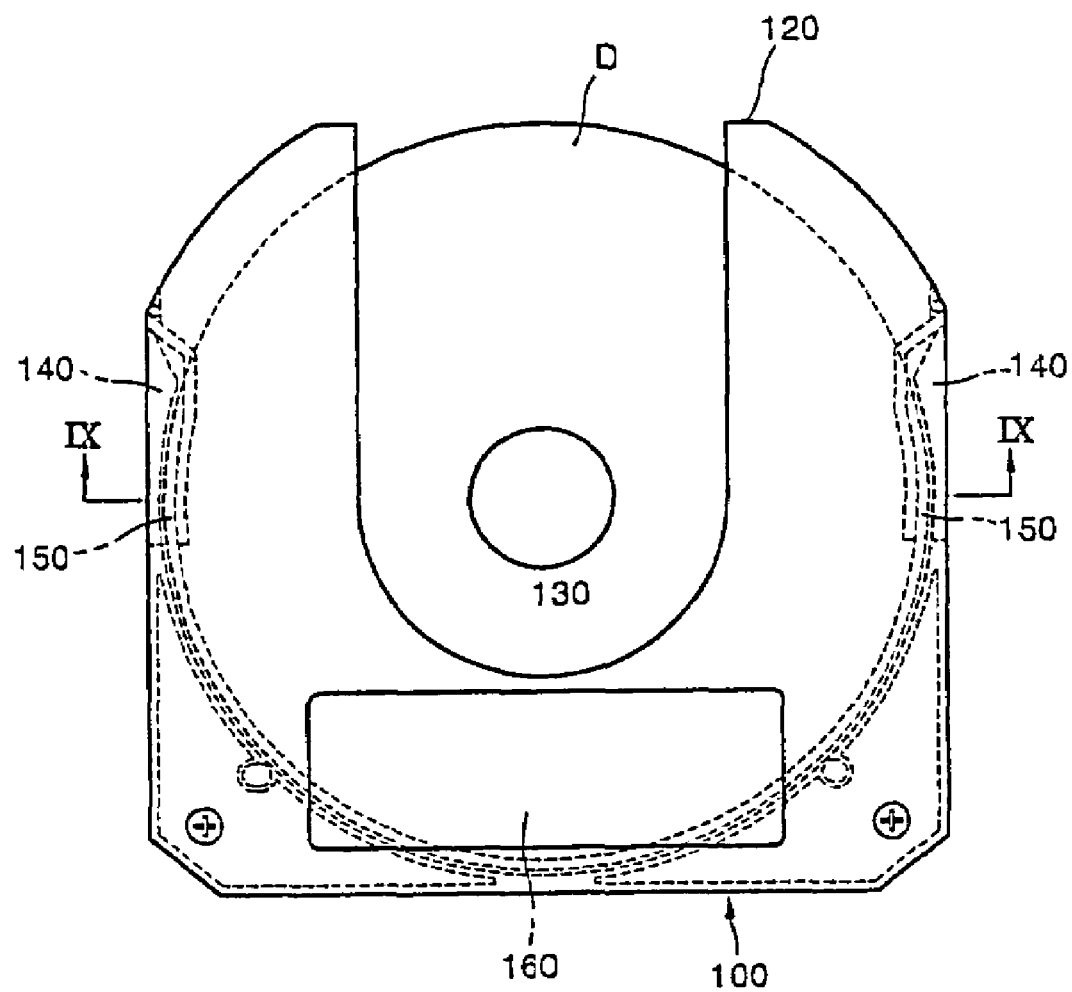

Operations for inserting the disk D into the disk cartridge 100 will be explained in reference to FIGS. 4 through 8. In FIG. 4, when the disk D is inserted into the disk cartridge 100 having the upper and lower cases 210 and 220 integrally formed with each other, first, the user holds an inner wall of the central hole H of the disk D and the outermost edge portion of the disk D and then inserts the disk D into the disk cartridge 100 through the inlet hole 120. In FIG. 5, the disk D contacts the elastic protrusions 140 which are inclined toward the inner receiving space 113. In FIG. 6, when the disk D continues to be inserted, the elastic protrusions 140 are elastically deformed and more distant from each other. In FIG. 7, when the disk D is completely inserted into the inner receiving space 113, the elastic protrusions 140 return to their original positions and prevent the disk D from being separated from the disk cartridge 100. Therefore, the disk D is safely accommodated in the case 110. If the disk cartridge 100 needs to be moved to another place, the user holds the upper and lower cases 210 and 220 of the disk cartridge 100 and moves the disk cartridge 100. When the disk cartridge 100 is loaded into the disk drive, the optical pickup can access the recording surface of the disk D through the opening 130 to perform the recording/reproducing operations.

When the disk D needs to be withdrawn from the disk cartridge 100, the user holds the inner wall of the central hole H of the disk D and the outermost edge portion of the disk D the same manner as if the disk D is inserted into the disk cartridge 100, and then pulls the disk D out of the inlet hole 120. The disk D elastically spreads the elastic protrusions 140 wider apart to be separated from the inner receiving space 113.

According to the disk cartridge 100 constructed as above, the disk D can be simply replaced with a new one if the user pulls the disk D out of the disk cartridge 100 through the inlet hole 120 and inserts the new disk into the disk cartridge 100.

Figure 10:
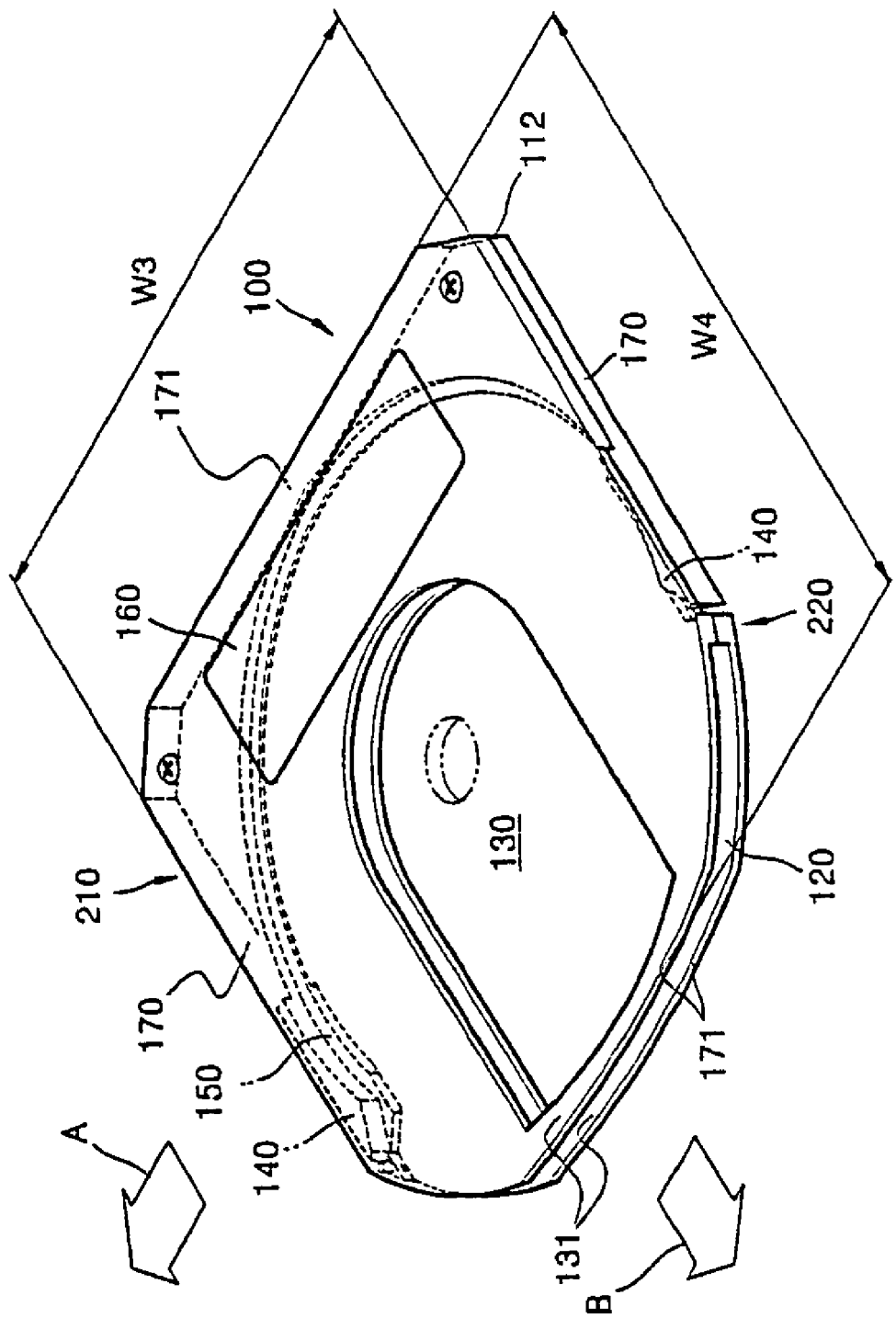
FIG. 10 is a perspective view of a modified example of the disk cartridge of FIG. 3.

FIG. 10 is a perspective view of a modified example of the disk cartridge of FIG. 3. The disk cartridge 100 further comprises upper and lower reinforcement portions 131, which are formed at a front end of the opening 130 to prevent a portion of the case 110 corresponding to the front end of the opening 130 from being deformed. Since the portion of the case 110 corresponding to the front end of the opening 130 is completely open to communicate with the inlet hole 120, it is easily deformed. Accordingly, the portion of the case 110 corresponding to the front end of the opening 130 can be prevented from being deformed if the upper and lower reinforcement portions 131 are formed at the front end of the opening 130.

First guide surfaces 170 are formed on the sidewall 112 in parallel to each other. The first guide surfaces 170 are in contact with a holder (not shown) disposed in the disk drive when the disk cartridge 100 is mounted on the disk drive. It is preferable that the first guide surfaces 170 are formed in the same direction as that of the opening 130 as shown in FIG. 10, but the present invention is not limited thereto.

Second guide surfaces 171 are formed on the sidewall 112 parallel to each other and in a direction other than that of the first guide surfaces 170, to be in contact with the holder disposed in the disk drive when the disk cartridge 100 is mounted on the disk drive. If a distance W3 between the first guide surfaces 170 is equal to a distance W4 between the second guide surfaces 171, the disk cartridge 100 can be loaded into the disk drive in both directions A and B. However, the present invention is not limited thereto.

Figure 11:
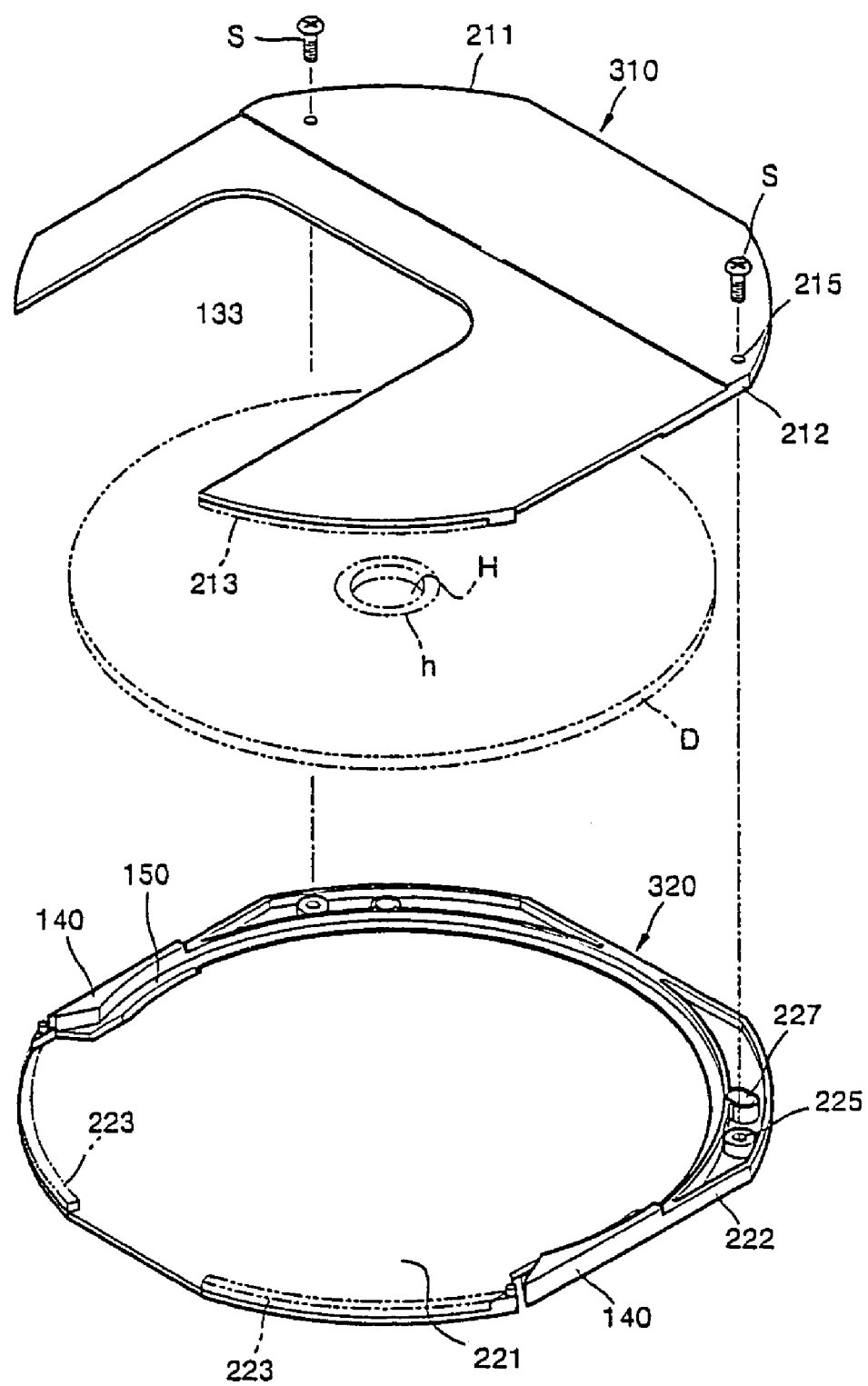
FIG. 11 is an exploded perspective view of a disk cartridge according to a second embodiment of the present invention.
Figure 12:
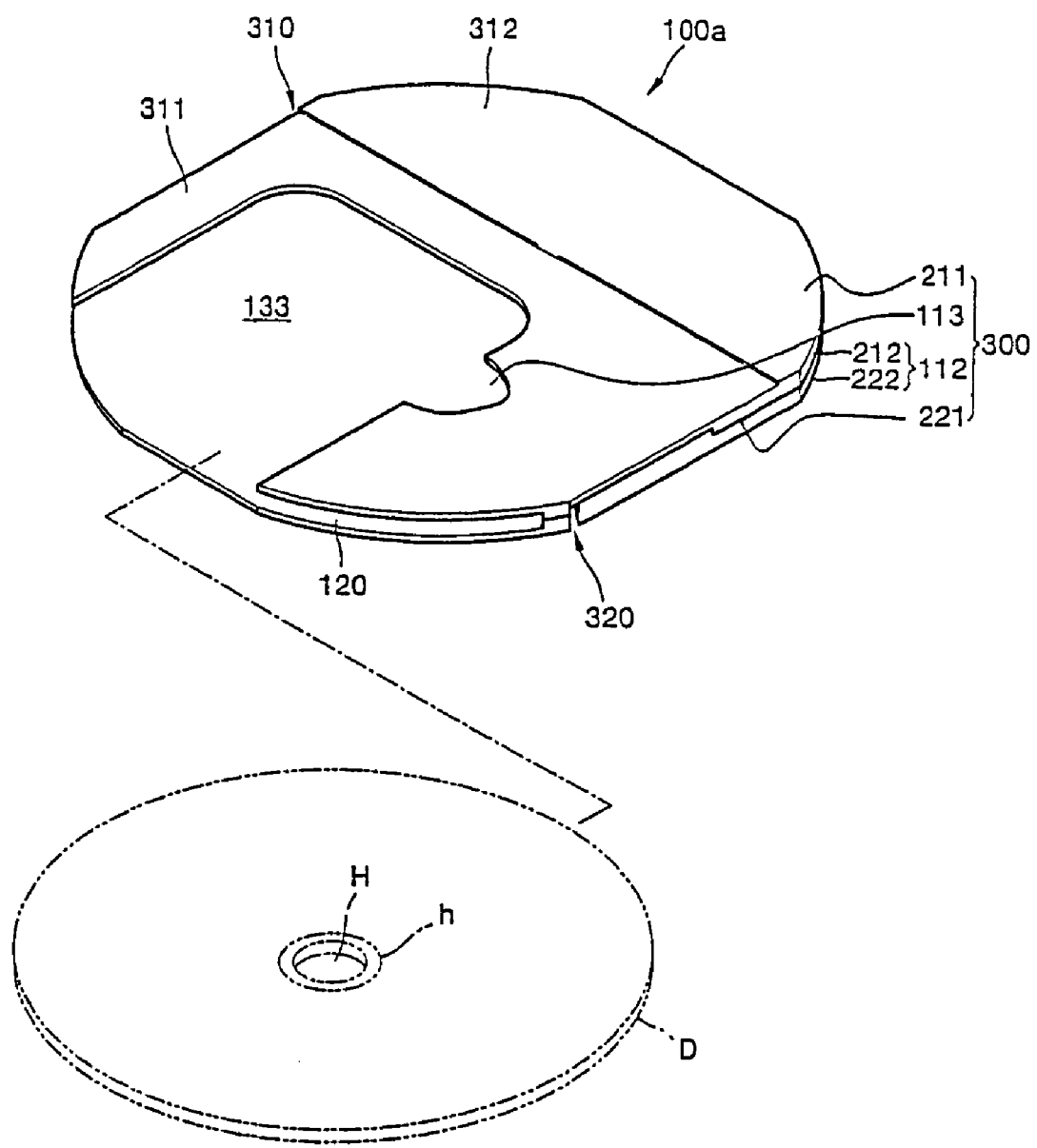
FIG. 12 is a perspective view of the disk cartridge of FIG. 11 when upper and lower cases are coupled to each other.

FIG. 11 is an exploded perspective view of a disk cartridge according to a second embodiment of the present invention. FIG. 12 is a perspective view of the disk cartridge of FIG. 11 when upper and lower cases are coupled to each other. The same reference numerals designate the same elements throughout FIGS. 3 through 12, and thus a repeated explanation will not be made.

In FIGS. 11 and 12, a disk cartridge 100a comprises a case 300. The case 300 comprises an upper case 310 and a lower case 320. The upper case 310 comprises an upper wall 211 and an upper sidewall portion 212, which downwardly extends from an edge portion of the upper wall 211. The lowercase 320 comprises a lower wall 221 and a lower sidewall portion 222, which upwardly extends from an edge portion of the lower wall 221. When the upper and lower cases 310 and 320 are coupled, the case 300 including the upper and lower walls 211 and 221, a sidewall 112, and an inner receiving space 113 is formed. Further, when the upper and lower cases 310 and 320 are coupled to each other, upper and lower open portions 213 and 223 face each other such that an inlet hole 120 is formed parallel to a recording surface of a disk D, and the disk D can be inserted into and withdrawn from the disk cartridge 100a through the inlet hole 120, accordingly as shown in FIG. 12.

In the disk cartridge 100a constructed as above, when the disk D is inserted into the case 300 through the inlet hole 120, elastic protrusions 140 are spread wider apart, and when the disk D is completely inserted into the inner receiving space 113, the elastic protrusions 140 return to their original positions such that the disk D is prevented from being separated from the case 300.

An opening 133 is formed in the case 300. The disk cartridge 100a according to the second embodiment of the present invention has the opening 133 which is asymmetrical with respect to a central hole H of the disk D. Therefore, it is not necessary to symmetrically form the opening 133 since the larger the opening 133, the better the disk cartridge 100a, unless the opening 133 decreases the strength of the disk cartridge 100a. The opening 133 is formed only in the upper case 310.

Figure 13:
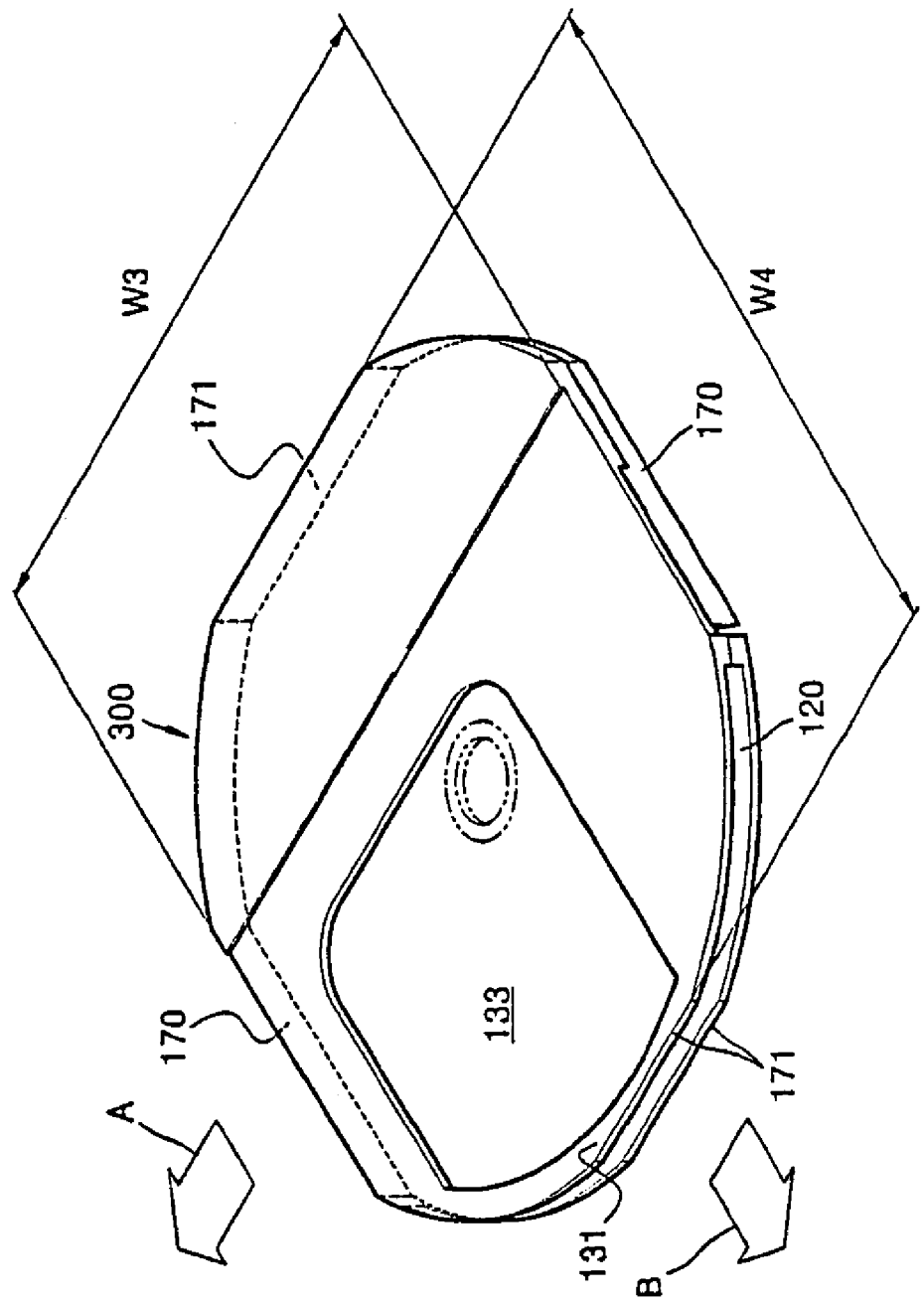
FIG. 13 is a perspective view of a modified example of the disk cartridge of FIG. 11.

FIG. 13 is a perspective view of a modified example of the disk cartridge 100a of FIG. 11. In FIG. 13, the disk cartridge 100a further comprises reinforcement portions 131 formed at a front end of the opening 133 to prevent a portion of the case 300 corresponding to the front end of the opening 133 from being deformed. First guide surfaces 170 may be further formed in the disk cartridge 100a in parallel to each other, and second guide surfaces 171 may be further formed in the disk cartridge 100a in parallel to each other and in a direction other than that of the first guide surfaces 170. A distance W3 between the first guide surfaces 170 may be equal to a distance W4 between the second guide surfaces 171.

The disk cartridge 100a according to the second embodiment of the present invention is used for a single sided disk D, and has the opening 133 formed only in one of the upper and lower cases 310 and 320. Therefore, a clamper, which faces a turntable and fixes the single sided disk D to the turntable, cannot be used. Thus, the single sided disk D is attached to the turntable by a magnetic force. The single sided disk D has a hub h made of metal material, e.g., magnetic stainless steel, fitted in a non-information side around the central hole H thereof. If the disk cartridge 100a is mounted on the disk drive, a magnet of the turntable is magnetically fixed to the hub h, and thus the single sided disk D is rotated by a spindle motor.

In FIG. 12, the upper case 310 comprises a first region 311 which extends from the inlet hole 120 and covers the opening 133, and a second region 312, which covers the remaining portion except the first region 311. The first region 311 permitting an optical pickup to access the disk D is as thin as possible in order to prevent any interference. The second region 312 is as thick as possible in order to reinforce the strength of the disk cartridge 100a. For these reasons, the second region 312 protrudes upwardly, beyond the first region 311. Accordingly, a large area can be secured for the optical pickup, and at the same time, the strength of the disk cartridge 100a can be improved. Although the entire second region 312 protrudes outwardly, the present invention is not limited thereto. As an alternative, a portion of the second region 312 may protrude upwardly, and the second region may also be formed on the lower case 320.

Figure 14:
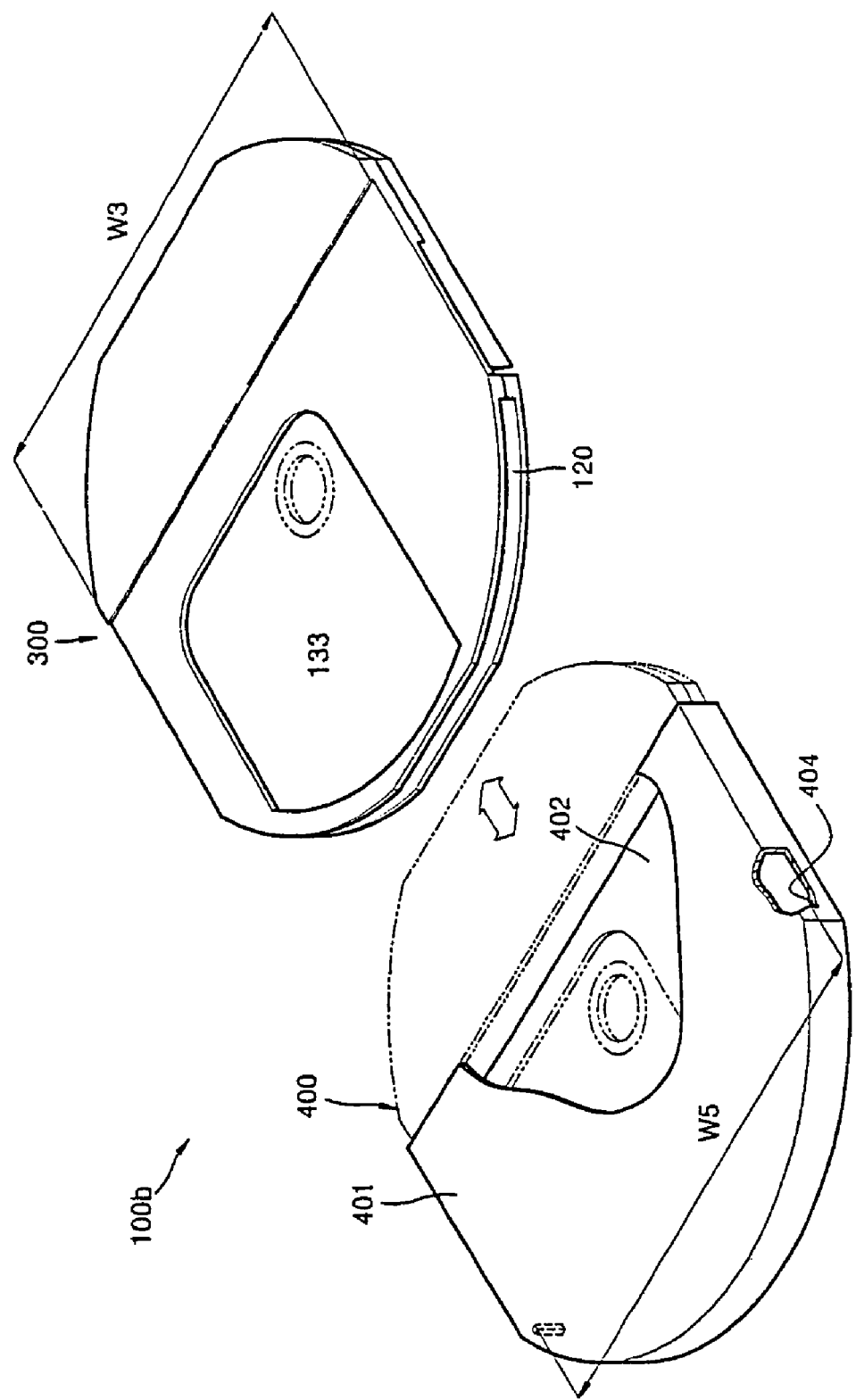
FIG. 14 is a perspective view of a disk cartridge according to a third embodiment of the present invention.

FIG. 14 is a perspective view of a disk cartridge 100b according to a third embodiment of the present invention. The disk cartridge 100b further comprises a cover 400 to protect a disk D. Although the cover applied to the case 300 illustrated in FIGS. 11 through 13 is explained for convenience in description, the cover is applicable to the case 110 illustrated in FIGS. 3 through 10 as well.

In FIG. 14, a cover 400 comprising a case accommodating space 402, and an outer wall 401 which defines the case accommodating space 402. The case accommodating space 402 accommodates areas ranging from an inlet hole 120 to at least an opening 133 of the case 300. The outer wall 401 comprises an opening to allow the case 300 to be inserted into and withdrawn from the cover 400 therethrough. Projections 404 project from the outer wall 401 toward the case accommodating space 402 to face each other. The distance W5 between the projections 404 is slightly smaller than a width W3 of the case 300 so that the case 300 is prevented from being unexpectedly separated from the cover 400.

The disk cartridge 100b is inserted into the cover 400 as shown in a dotted line of FIG. 14. When the disk cartridge 100b is loaded into a disk drive, the cover 400 is detached from the case 300 and only the case 300 is mounted in the disk drive. Accordingly, the disk cartridge 100b constructed as above can prevent a recording surface of the disk D from being contaminated through the opening 133 while being moved.

As described above, the present invention has the following effects.

First, since the disk can be inserted into and withdrawn from the disk cartridge by being pushed into and pulled out of the disk cartridge through the inlet hole, the disk is replaced with a new one in a more convenient and faster manner.

Second, since the case does not need to be opened or closed whenever the disk is replaced, the case is prevented from being deformed or damaged due to frequent opening/closing operations.

Third, since the first region has a different thickness from that of the second region, a wider area is secured for the optical pickup and the strength of the disk cartridge is also improved.

Fourth, since the cover is further provided, the recording surface of the disk is prevented from being contaminated when the disk cartridge is moved, and since the structure of disk cartridge is simple, production costs are reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disk cartridge comprising:
   a case having an upper wall, a lower wall, and a sidewall, which form an inner receiving space in which a disk is inserted;
   an opening formed in at least one of the upper wall and the lower wall of the case to allow a recording/reproducing unit of a disk drive to access a recording surface of the disk to perform recording/reproducing operations;
   an inlet hole formed at the sidewall of the case to allow the disk to be inserted into and withdrawn from the inner receiving space; and
   elastic protrusions which are formed within the case and extend from opposite sides of the sidewall of the case and are elastically biased toward the inner receiving space,
   wherein the disk is inserted into the inner receiving space, via the inlet hole, when the disk overcomes the elastic force of the elastic protrusions and elastically spreads the elastic protrusions apart.

2. The disk cartridge of claim 1, wherein the case further comprises:
   an upper case having the upper wall and an upper portion of the sidewall, which extends from an edge portion of the upper wall; and
   a lower case having the lower wall which faces the upper wall and a lower portion of the sidewall which upwardly extends from an edge portion of the lower wall.

3. The disk cartridge of claim 2, further comprising:
   an upper open portion and a lower open portion respectively formed on the upper portion of the sidewall and the lower portion of the sidewall in parallel to the recording surface of the disk,
   wherein, when the upper and lower cases are coupled to each other, the upper and lower open portions face each other, forming the inlet hole in parallel to the recording surface of the disk.

4. The disk cartridge of claim 2, wherein the upper case is coupled to the lower case by a coupling member.

5. The disk cartridge of claim 2, wherein the upper case is coupled to the lower case by thermal bonding.

6. The disk cartridge of claim 1, wherein a distance between the elastic protrusions is smaller than a diameter of the disk.

7. The disk cartridge of claim 1, further comprising a support portion formed in the case to support an outermost edge portion of the disk.

8. The disk cartridge of claim 7, wherein the support portion comprises upper and lower support portions respectively projected from the upper and lower cases and supporting the outermost edge portion of the disk to protect a recording surface of the disk.

9. The disk cartridge of claim 1, wherein the opening is symmetrical with respect to a central portion of the disk.

10. The disk cartridge of claim 8, wherein the opening is asymmetrical with respect to a central portion of the disk.

11. The disk cartridge of claim 1, further comprising a reinforcement portion formed at a front end of the opening of the disk cartridge.

12. The disk cartridge of claim 11, wherein the reinforcement portion comprises an upper and a lower reinforcement portion which are formed at the front end of the opening to prevent a portion of the case corresponding to the front end of the opening from being deformed.

13. The disk cartridge of claim 1, further comprising first guide surfaces formed on the sidewall of the case in parallel to each other.

14. The disk cartridge of claim 13, further comprising second guide surfaces formed on the sidewall of the case in parallel to each other and in a direction other than that of the first guide surfaces.

15. The disk cartridge of claim 14, wherein a distance between the first guide surfaces is equal to a distance between the second guide surfaces.

16. The disk cartridge of claim 1, wherein at least one of the upper wall and the lower wall comprises a first region, which extends from the inlet hole and covers the opening, and a second region, which covers a remaining portion except the first region, and at least a part of the second region protrudes upwardly beyond the first region.

17. The disk cartridge of claim 1, wherein, when the disk is completely inserted into the inner receiving space, via the inlet hole, the elastic protrusions return to original positions such that the disk is prevented from being separated from the case.

18. A disk cartridge comprising:
   a case having an upper wall, a lower wall, and a sidewall, which form an inner receiving space in which a disk is inserted;
   an opening formed in at least one of the upper wall and the lower wall of the case to allow a recording/reproducing unit of a disk drive to access a recording surface of the disk;
   an inlet hole formed at the sidewall of the case to allow the disk to be inserted into and withdrawn from the inner receiving space formed between the upper wall and the lower wall by the sidewall; and
   a cover having a case accommodating space and an outer wall which defines the case accommodating space for accommodating an area of the disk cartridge.

19. The disk cartridge of claim 18, wherein the outer wall comprises an opening to allow the case to be inserted into and withdrawn from the cover therethrough.

20. The disk cartridge of claim 19, wherein the cover further comprises projections which project from the outer wall toward the case accommodating space and facing each other, wherein the projections prevent the case from being separated from the cover.

21. The disk cartridge of claim 20, wherein a distance between the projections is smaller than a width of the case to prevent the case from being separated from the cover.

22. A disk cartridge comprising:
   a receiving wall having an opening, wherein a disk is slidingly inserted into and from the disk cartridge;
   a sidewall which protrudes upwardly beyond the receiving wall, wherein the thickness of the sidewall is greater than the thickness of the receiving wall to strengthen the disk cartridge being inserted into a disk drive;

upper and lower support portions located inside of the receiving wall to support edges of the disk while the disk is being slidingly inserted into the opening of the receiving wall; and elastic protrusions formed on an inner portion of the receiving wall which are elastically biased toward a center of the opening, wherein the disk is slidingly inserted into the opening when the disk overcomes the elastic force of the elastic protrusions and elastically spreads the elastic protrusions apart.

23. The disk cartridge of claim 22, further comprising:

reinforcement portions formed at a front end of the opening to prevent a portion of the disk cartridge corresponding to the front end of the opening from being deformed.

24. The disk cartridge of claim 22, wherein, when the disk is located in the opening, the elastic protrusions return to original positions and prevent the disk from being separated from the disk cartridge.

25. The disk cartridge of claim 18, further comprising:

elastic protrusions formed within the case and extended from opposite sides of the sidewall of the case, wherein, when the disk is inserted into the inner receiving space, via the inlet hole, the elastic protrusions are elastically spreaded apart to accommodate insertion of the disk, and, when the disk is completely inserted into the inner receiving space, via the inlet hole, the elastic protrusions return to original positions such that the disk is prevented from being separated from the case.

* * * * *